June 21, 1966  J. C. MARINACE ET AL  3,257,626

SEMICONDUCTOR LASER STRUCTURES

Filed Dec. 31, 1962  3 Sheets-Sheet 1

INVENTORS
JOHN C. MARINACE
RICHARD F. RUTZ
BY
*Curtis Ailes Jr.*
ATTORNEY

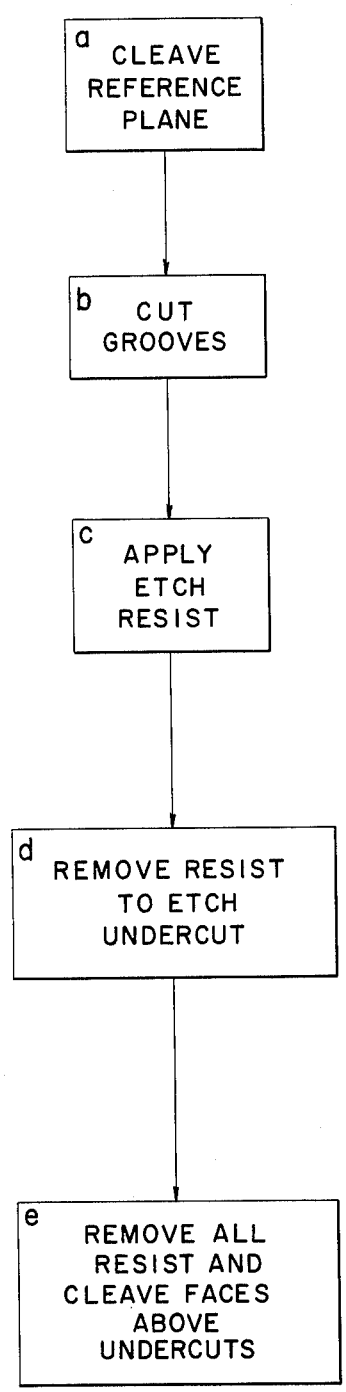
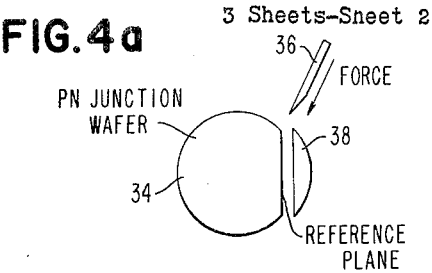
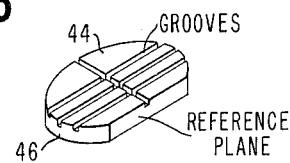
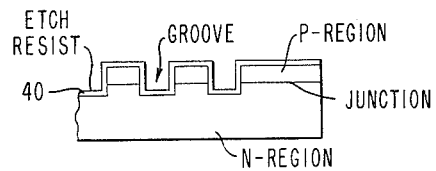
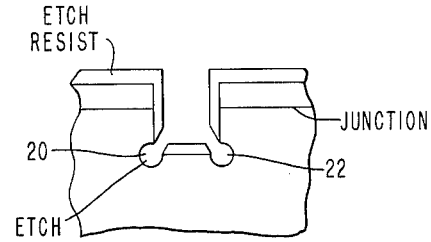
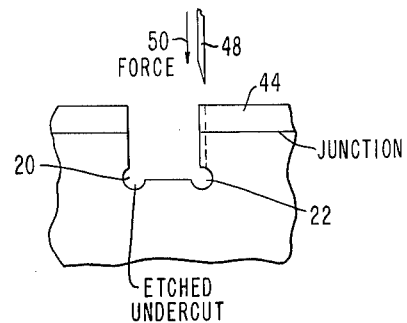

United States Patent Office 3,257,626
Patented June 21, 1966

3,257,626
SEMICONDUCTOR LASER STRUCTURES
John C. Marinace, Yorktown Heights, and Richard F. Rutz, Cold Spring, N.Y., assignors to International Business Machines Corporation, New York, N.Y., a corporation of New York
Filed Dec. 31, 1962, Ser. No. 248,380
9 Claims. (Cl. 331—94.5)

This patent application relates to the formation of special crystal shapes, and more particularly to semiconductor material crystal shapes forming semiconductor devices for circuit elements.

For certain purposes it is very important in the production of semiconductor junction elements to provide the elements in very small precisely determined geometric shapes having substantially perfect optical plane surfaces. For instance, in semiconductor junction devices and elements which are to be employed as injection lasers displaying the phenomenon of stimulated emission of radiation, very stringent requirements are placed on the shape and dimensions of the elements.

For such purposes, electromagnetic energy in the light wavelength region is involved, and the requirements on the crystalline body of which the device is made are such that the surfaces frequently must be plane parallel, optically reflective and be operationally related to each other by physical dimensions which are of the order of magnitude of a few multiples of the light wavelength.

With such stringent requirements being placed on a device roughly comparable to the size of a human hair the problem of fabrication has become nearly insurmountable. In order to fabricate an object having such a size the object must be shaped from some larger quantity of the material from which the object is made and this requires extreme care not only to prevent errors in the actual shaping operation but also in protecting the element from damage during the shaping. These manufacturing problems have in combination resulted in making the advancement of the art very difficult.

Accordingly, it is one important object of the present invention to provide an improved fabrication technique for semiconductor crystalline bodies of extremely small size in which some of the problems of size are solved by making the body or element as a part or substructure of a larger structure.

It is another object of this invention to provide a technique of providing optically flat surfaces on a small element of a larger semiconductor structure.

It is another object of this invention to provide crystalline semiconductor elements having crystallographically perfect parallel and perpendicular shapes.

It is another object of this invention to provide small crystalline semiconductor elements having crystallographically perfect geometric shapes which form part of a larger semiconductor body.

It is another object of this invention to provide such crystalline elements having surface dimensions separated by very short distances approaching the magnitude of light wavelength.

It is another object of this invention to provide an improved method of fabricating small crystalline devices.

It has now become apparent that various semiconductor crystal structures, including such structures as injection lasers are advantageously arranged with one element aligned in proximity with another element in order to receive optical signals therefrom. In other words, one of the elements provides an optical light output which serves as an optical input to the other. Since these devices have been shown to produce coherent light which is emitted in an extremely narrow beam which is very directional, and since the size of the element itself is so small, an extremely difficult problem of optical alignment is presented in any system employing elements between which optical signals are to be transferred.

Accordingly, it is another object of the present invention to provide epitaxial crystal structures including several elements as different portions of the same crystal between which optical signals may be transferred.

Another object of the present invention is to provide structures incorporating several semiconductor elements, which are suitable for operation as lasers, together with associated structure which assures perfect optical alignment therebetween.

Many efforts have been directed to what has been termed "micro-miniaturization" of various electrical circuits and systems including semiconductor switching devices or elements. The advantages of the production of extremely small systems are obvious for purposes of portability, limitation of heat losses, and so forth.

Accordingly, it is a further object of the present invention to provide a new method of fabrication of multiple element semiconductor electrical switching structures which are particularly advantageous for miniaturization of circuits and systems.

As the frequency of electromagnetic energy handled in solid state devices has increased and proceeded into the light wavelength region the requirements on the physical shapes of the crystalline bodies have become more and more difficult to achieve. Where devices such as lasers are constructed, these requirements can be on the order of a few multiples of the light wavelength. For example, to establish a proper perspective, light at the limit of optical visibility has a wavelength of the order of 8000 Angstrom units which in turn is of the order of 0.000032 inch or 32 millionths of an inch.

Further, advances in the art involving optical mode enhancement in these devices have placed stringent requirements not only on the physical dimensions between surfaces but also on the angle that those surfaces make with each other and the optical reflectivity of the surfaces. The surfaces not only must be optically flat for reflection purposes and to reduce light scattering but they must also meet at the proper angle, and further, the distance from one reflecting surface to another must be within a selected range of multiples of the wavelength involved. Frequently this requires that a surface be flat within a twentieth of a wavelength, and that the surfaces intersect at a precise angle such as 90°.

Thus far in the art such requirements and the extreme smallness of the objects being handled have required extreme care in fabrication. The crystal must be oriented generally with X-ray equipment and then properly supported, generally by embedding in a plastic material for grinding to a precise dimension. This is repeated for each side. When each dimension and its relationship to others is established, the crystal then must be removed from the supporting material and examined for such misfortunes as over-stressing, cracking, formation of dislocations, and otherwise changing of properties due to the abrasion or other shaping operation employed. Associated with each step are handling and mounting problems which in combination cause great difficulty in getting a good device.

In accordance with the related prior invention, which forms the subject matter of a prior patent application Serial No. 234,141 filed on October 30, 1962 now Patent No. 3,217,233 by Frederick H. Dill, Jr. and Richard F. Rutz for a "Method of Fabrication of Crystalline Shapes," and assigned to the same assignee, many of the last mentioned problems have been effectively overcome. In accordance with that invention a technique was discovered for the fabrication of crystalline bodies into physical shapes wherein the control of dimensions is of the order of magnitude of a light wavelength while simultaneously providing extremely accurate optically flat surfaces related by accurate geometrical intersections. This is accomplished by establishing the force product of the bond strength times the distance through the crystal coinciding with the crystallographic plane having the minimum bond strength to be less than the force product of any other distance times the crystallographic plane bond strength coinciding with that distance, and subjecting the crystal to a force whereby separation in the minimum bond strength plane occurs. The separation is thus accomplished with a minimum of force being applied.

By this process crystalline shapes having very high precision optically flat faces related in exact geometries and spacing can be achieved.

More specifically, the prior process may be practiced by supporting the crystal on a broad area crystallographic face that is perpendicular to the crystallographic plane having the minimum bond strength of the particular crystalline material employed, and then applying a cleaving force parallel to the crystallographic plane having minimum bond strength and in the direction of the support. This will operate to cleave the crystal on a precise line which corresponds to the minimum bond strength crystallographic plane and will result in making available the internal structure of the crystalline body to govern the optical flatness of the surfaces, and the angles that the surfaces make with each other. As a result, useful crystal bodies may be fabricated with surface flatness considered to approach 10 Angstrom units, and devices may be fabricated to size on the order of 0.0015 x 0.0015 x 0.005 inch.

The present invention constitutes an improvement over that prior invention in which the crystal separation teachings are employed together with other steps to produce single element devices which are easier to handle, and also multiple-element devices which have substantial other uses and advantages as will appear more fully below.

In carrying out the process and in producing the product in one preferred form thereof, the following steps are employed: a semiconductor crystal wafer is cut from a larger crystal body along a plane perpendicular to crystallographic planes exhibiting minimum bond strength. The edge of the crystal wafer is then cleaved along a crystallographic plane thereof which exhibits a minimum bond strength to form a reference plane. Portions of the surface of the crystal wafer are then cut away along lines respectively parallel and perpendicular to the reference plane to a depth below the junction to form at least one rectangular protrusion from the main body of the crystal wafer, the protrusion then containing the junction between different semiconductor conductivity types. Next, the lower edges of the cut faces of the protrusion are undercut. Then at least two of the opposite cut faces of the protrusion are cleaved from the upper surface to the undercut edges. The cleaving is carried out along crystallographic planes that exhibit minimum bond strength which are mutually parallel and which are both either perpendicular to or parallel to the reference plane.

The foregoing and other objects, features and advantages of the invention will be apparent from the following description and the accompanying drawings which are briefly described as follows:

FIG. 3 is a flow diagram indicating the various steps to be followed in a preferred form of the method of the present invention.

FIGS. 4a, 4b, 4c, 4d and 4e respectively illustrate each of the various steps which are indicated in the corresponding portions of FIG. 3.

Figure 5:
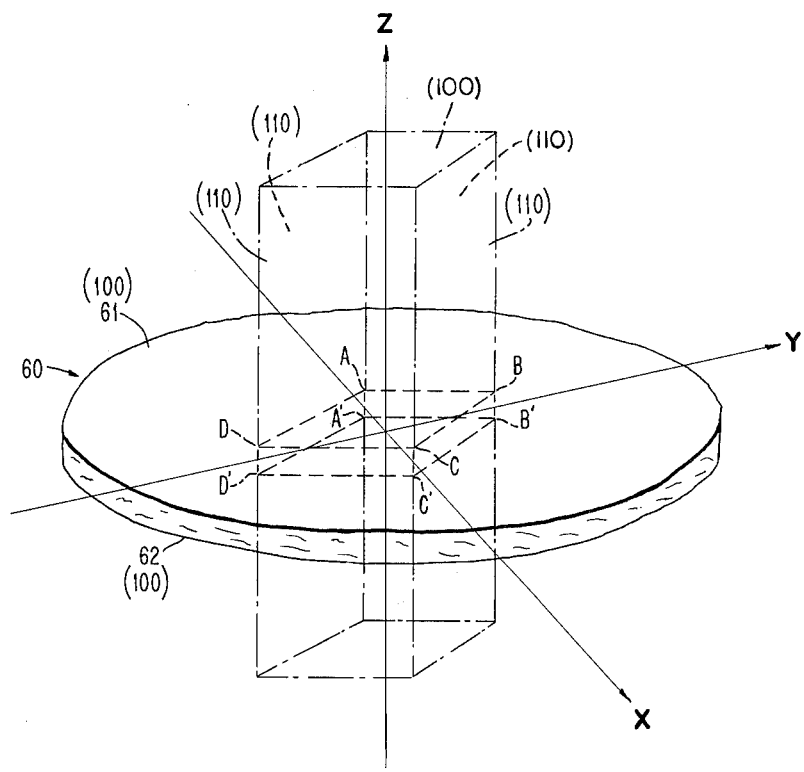

And FIG. 5 illustrates a typical crystal wafer employed in the process of the present invention together with representations of geometrical crystal relationships within the crystal which are important to the practice of this invention.

Figure 1:
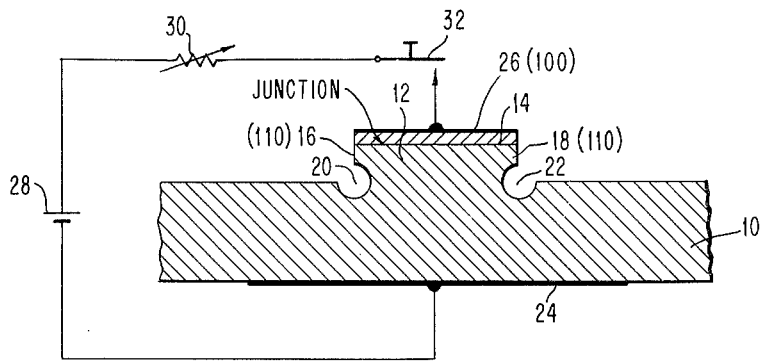
FIG. 1 is a sectional view of a semiconductor crystal structure produced in accordance with the present invention having a single circuit element with a schematic biasing circuit attached thereto.

Referring more particularly to the drawings, FIG. 1 is a sectional view of a semiconductor crystal element or device produced in accordance with the process of the present invention. A main body 10 of a semiconductor crystal material is provided with a protruding crystal element 12 having a junction of different semiconductor conductivity types as indicated at 14. Two opposite faces 16 and 18 of the protruding element are each formed along the crystallographic planes of minimum crystal bond strength. Undercuts are provided as indicated at 20 and 22 beneath the faces 16 and 18.

The crystal 10 is provided with an electrical contact at the lower surface as indicated at 24, and the element includes an upper contact indicated at 26. An excitation circuit is schematically shown connected between these contacts and including a cell 28, a variable impedance 30, and a switch 32. This device may be a gallium arsenide injection laser which is capable of emitting coherent light such as the devices shown and described in copending patent application Serial No. 234,150 filed on October 30, 1962 by Frederick H. Dill, Jr. et al. for "Lasers" and assigned to the same assignee as the present application.

Figure 2:
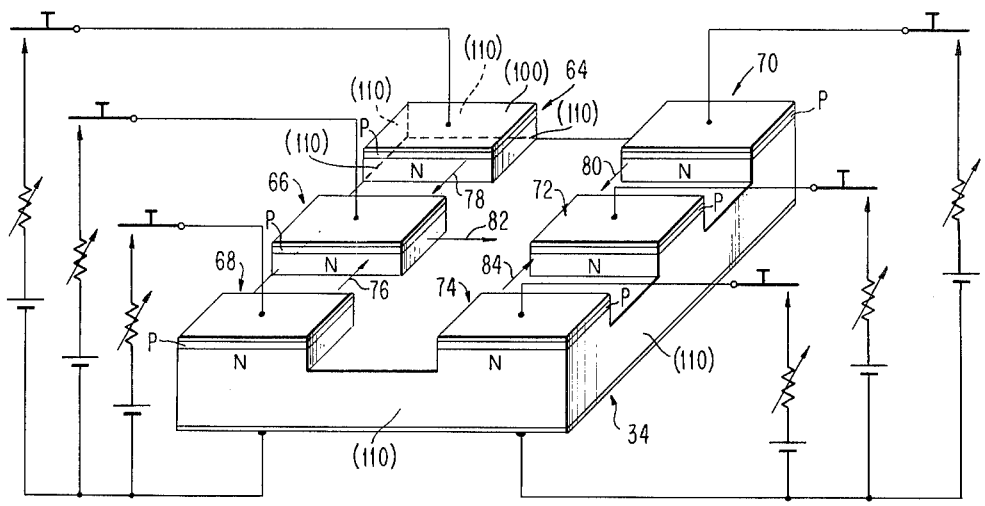
FIG. 2 is a perspective view of a similar structure incorporating a plurality of circuit elements which are arranged for exchange of optical signals therebetween.

FIG. 2 is a perspective view of a multiple eelment device similar to the device of FIG. 1 in which a plurality of elements have been formed as protrusions of a single crystal. This arrangement assures efficient transmission of optical signals between adjacent elements. This structure will be described more fully below.

FIG. 3 is a flow chart illustrating the various steps which may be followed in carrying out one preferred form of the method of the present invention.

FIGS. 4a through 4e illustrate the operations carried out in each of the various steps "a" through "e" in the flow chart of FIG. 3. Accordingly, the process steps shown in FIG. 3 and the illustrations of those steps in FIGS. 4a through 4e will be described together.

First a semiconductor crystal wafer must be obtained whose main faces are related to the crystal structure such that they are essentially parallel and each perpendicular to crystallographic planes exhibiting minimum bond strength. If special conductivity regions or junctions are required, then these properties are imparted to the crystal wafer by conventional methods.

Then, a crystallographic plane will serve as a reference plane for further operations. Further details on the theory and procedures of this and other cleaving operations of this invention will be given below.

In step "b" of FIG. 3, as illustrated in FIG. 4b, grooves are cut in the upper surface 44 of the crystal wafer, and these grooves are respectively parallel and perpendicular to the reference plane. While only a few grooves are shown in FIG. 4b, it will be understood that many grooves may be added to the upper surface to form additional device protrusions if desired. If only a single device or element is desired, as illustrated in the embodiment of FIG. 1, then the entire surface of the crystal wafer is cut away except for a single rectangular protrusion as defined by side cuts which are again parallel to and perpendicular to the reference plane.

In carrying out the process of the present invention, undercuts must be provided at the lower edges of the protrusions of the crystal remaining after the grooving step. As a first step in providing these undercuts, an "etch resist" material of a conventional bituminous wax may be applied to the grooved surface of the crystal as shown at 40 in FIG. 4c, and step "c" of FIG. 3.

In step "d" of FIG. 3 illustrated in FIG. 4d, a small amount of the etch resist material may be selectively removed from the corners of the bottom of the groove as by a scribing tool, and then the crystal may be placed in an etching solution in order to etch undercuts as shown at 20 and 22.

In FIG. 3, step "e" illustrated in FIG. 4e, the etch resist material is then removed, as by means of a suitable solvent, and the faces of the protrusions are carefully cleaved along the walls of the original grooves from the upper surface 44 to the undercut at 22. The undercut serves to interrupt the line of separation along the cleavage plane of minimum crystallographic bond strength, permitting the main body of the crystal wafer to remain intact as a support for the devices formed by the protrusions. Suitable electrical contacts are then applied to the individual elements as illustrated in FIGS. 1 and 2, by vapor deposition, or by other known methods. If desired, metallic contact material may be applied to the upper surface 44 prior to the performance of steps "a" through "e."

As previously stated, the crystal wafer 34 of FIG. 4a is initially formed by cutting it so that its major surfaces coincide with a crystallographic face that is perpendicular to the plane of the minimum bond strength of the crystal.

For crystals of the polar type, such as the intermetallic compounds well known in the semiconductor art including, for example such compounds as gallium arsenide (GaAs), indium phosphide (InP), and indium antimonide (InSb), the plane of minimum bond strength is the (110) crystallographic plane.

In cubic type crystals, such as those formed from the monoatomic semiconductors, germanium and silicon, the crystallographic plane of minimum bond strength has been found to be the (111) plane.

The identification of the crystallographic planes is accomplished in the art by bracketed numerals known as Miller Indices. These indices are established by taking the reciprocal of the intercept values where the crystallographic intersects the three imaginary dimension axes of the periodic atomic array of the crystal. For example, for the (110) crystallographic plane this plane intercepts two of the three axes one unit from the point of axis intersection and is parallel to the third of these three axes so that the reciprocals would then be 1/1, 1/1, and 1/∞ so as to give the Miller Indices 1, 1, and 0.

The art of crystallography is set forth in many references for example An Introduction to Semiconductors by W. C. Dunlap, Library of Congress Card No. 56–8691, Chapter 2, and the references cited therein. Another example is Elementary Crystallography by Martin J. Buerger, published in 1956 by John Wiley and Sons.

As previously mentioned, the crystal wafer 34, as shown in FIG. 4b has faces 44 and 46 that are cut perpendicular to the minimum bond crystallographic plane for the particular type of crystal. This minimum bond crystallographic plane is the plane preferred by the crystal for cleavage. The cutting of the wafer is accomplished by mounting the crystal for appropriate X-ray orientation so that information related to the refraction of X-rays from particular crystallographic planes is calibrated in terms of crystal position, and then slicing the crystal perpendicular to the minimum bond strength crystallographic plane in accordance with this information. The X-ray orientation technique is well known in the art and since equipment is available for its practice, it will not be described in detail. Any orientation technique including trial crystal breaking to determine preferred cleavage planes that will permit positioning of a crystal for cutting with reference to a particular crystallographic plane therein may be employed. After this initial wafer cutting operation, many device fabrication steps such as lapping, polishing, diffusion, epitaxial growth, junction formation, mirroring of surfaces, and application of contacts may be accomplished at this point. The various steps outlined in FIG. 3 are then performed on the crystal wafer. When the cleaving step is reached, as shown in FIG. 4e, a force member 48 shown schematically as a blade is next brought in contact with the upper surface 42 of the crystal. Movement is in the direction of arrow 50 and because of the shape of the blade 48, force is applied in the direction to separate the parts of the crystal and overcome the minimum bond strength. The force may be applied across the entire length of the surface, or on a restricted point, so that the cleavage may propagate through the crystal to the undercut 22. The blade 48 is intended as a schematic showing of a force member. The force member may be any source of localized stress such as an ultrasonic vibration which employs the localized stresses in the crystal body. In the case of the ultrasonic force application, the crystal may be in a liquid bath.

In accordance with the invention, it is essential only that the crystal be subjected to a localized stress in a direction that gives the minimum force to separate the crystal along the plane of minimum bond strength through the particular crystalline element of the body being processed. For example the crystal is supported along a crystallographic plane that is perpendicular to the face to be exposed by cleavage and this face corresponds to the crystallographic plane of minimum bond strength in the crystal. The orientation and larger crystalline material body shape being processed must cooperate to insure not only the correct ultimate device shape but also to insure that no undesired stresses or fractures be introduced by random forces. The crystal is subjected to stress, and this stress is so applied that the parts will separate with the absolute minimum of force and the cleavage preferably occurs at the minimum distance through the crystal. When this occurs, the face exposed is optically flat and the angles made with each exposed face is the perfect geometrical angle the cleavage planes make in the crystal. The crystallographic geometry of the crystal is now available for further cleavage operations, and thus will govern the precise relationship of interplane parallelism and the angle of intersection and all faces exposed will be optically flat. In the majority of devices wherein volumetric geometry of surfaces is required there are at least two cleavage operations involved.

The cleavage of brittle objects is a very ancient art having been practiced in the diamond cutting and stone cutting trade. However, in the past, cleavage operations were directed to merely dividing objects into parts and this is widely used in transistor fabrication to separate several devices made simultaneously. This frequently results in irregular cleaved surfaces. However the cleaved surfaces in the past have played no part in the operation of the device.

As previously stated, in polar type crystals of the type such as the intermetallic semiconductors well known in the art, for example gallium arsenide, the cleavage plane of minimum bond strength is the (110) crystallographic plane. In FIG. 5, there is illustrated the geometrical relationships present in the crystal with relation to the (110) and (100) crystallographic planes. To provide perspective, a wafer 60 is illustrated having x and y axes lying in its upper surface 61 and a z axis being perpendicular thereto. The (100) planes each intersect perpendicularly four planes correlatable with (110) planes each so labelled in FIG. 5. The surface 61 corresponds to the (100) crystallographic plane. The planes in the surfaces of the wafer 60 each intercept the z axis at 1 or −1 unit and are parallel to both the x and the y axes, hence the Miller Indices (100). These planes, as may be seen from FIG. 5, have been identified with the rectangle ABCD in surface 61 and A′B′C′D′ in the lower surface 62 of the crystal wafer. As is illustrated, the geometric relationship within the crystal will permit identification of four rectangular planes of intersection of the (110) or equivalent crystallographic plane and the 100 crystallographic plane. When the surface of the crystal has been made to correspond with the 100 plane the two rectangles ABCD and A′B′C′D′ representing the surfaces 61 and 62 of the wafer now intersect perpendicularly four (110) crystallographic planes each in turn joining an adjacent plane at 90°. These intersections are illustrated by four rectangles which are identified as AA′D′D, ABB′A, BCC′B′, and CC′D′D.

FIGS. 1 and 2 illustrate the use of the crystallographic geometry present in the crystal in accordance with the invention to provide rectangular parallelpiped crystalline shapes. Thus, referring to FIG. 1, the upper surface beneath the upper contact 26 corresponds to a (100) crystallographic plane, and each of the side faces 16 and 18 correspond to a (110) crystallographic plane as indicated on the drawing.

Referring more particularly to FIG. 2, the six crystal protrusions indicated at 64, 66, 68, 70, 72, and 74 have each of their side faces corresponding to (110) crystallographic planes, and each of their upper surfaces corresponding to (100) crystallographic planes. These crystallographic relationships are indicated for the element 64 only. The surfaces and faces of the other device forming protrusions are understood to have the same relationship. Because of the fact that all of the protrusions 64 through 74 are formed, and remain as a part of the original crystal wafer 34, the cleaved surfaces of adjacent protrusion elements are perfectly parallel. This feature is quite important as will appear more clearly below. Further, as a result of the crystallographic geometry of the crystal, each surface cleaved along a single crystallographic plane has optically flat sides, and intersections with the other surface are at a precise 90° angle governed by the crystal geometry. Further, cleaved surfaces on opposite sides of each element are perfectly parallel.

The physical dimensions from one surface to another of the crystalline shape will be governed by the degree of accuracy of positioning the cleavage implement 48 illustrated in FIG. 4e. It will be apparent that the edge of the implement must be of a straightness and sharpness of the order of the dimensions being sought. The cleavage implement 48 should be sufficiently sharp that the force is confined to a small area. As in order of magnitude figure using approximately a four ounce pressure on a crystal approximately 0.250 inch long, crystal elements may be cleaved that are 0.0015 x 0.0015. It should be noted that bond strengths vary with different crystals and with environmental conditions. It will be apparent that with appropriate mechanical spacing equipment as is employed in diffraction grating manufacturing, even smaller physical sizes may be achieved.

As discussed in more detail in the related copending patent application Serial No. 234,141, recognition and identification of the various crystallographic planes also provides the possibility for production of crystal elements having angles that are multiples of sixty degrees in the form of equilateral triangles, trapezoids, diamond shapes, and hexagons. This is done by cutting the original crystal wafer along the (111) crystallographic plane. It is possible also, through recognition and identification of crystallographic planes of minimum bond strength to cleave certain faces of the crystal elements of the present invention at angles other than ninety degrees to the base of the crystal wafer. The resultant element is useful for certain purposes. In some instances this is advantageous as it eliminates the need for the undercut where the cleavage face slants upwardly.

Referring again to FIG. 2, the crystal wafer 34 may be composed basically of N-type conductivity semiconductor material. The crystal may be composed of gallium arsenide, for instance. This wafer may be diffused with conductivity determining impurities such as zinc so as to form in the upper surface thereof a P-type conductivity region with a junction between the P and N types. In the fabrication of either the single element device shown in FIG. 1, or the multiple element structure shown in FIG. 2, the material which is cut away from the upper surface of the crystal, and removed by the later cleaving process is preferably sufficient to penetrate below the junction region and to remove all of the P-type conductivity material in the cutaway portions so that the element formed by each crystal protrusion has an electrically isolated P-region and an electrically isolated junction between the P and N type materials. Each of the elements is provided with its own source of current as schematically indicated by the appropriate circuit elements in the drawing.

It has been discovered that if semiconductor junction elements such as these are subjected to a sufficient electrical excitation, they will act as optical masers, or "lasers," in which electrical energy is converted to coherent light. Various crystal structures for accomplishing this form a portion of the subject matter disclosed in copending related patent application Serial No. 234,150, filed on October 30, 1962, by Frederick H. Dill et al. for "Lasers" and assigned to the same assignee as the present application. In that patent application it is pointed out that certain major advantages are to be realized in laser efficiency by maintaining the length of the crystal elements in the order of at least ten times the crystal element width when viewed from above the crystal element. Accordingly, it is preferred that the individual crystal elements of the present invention be constructed in accordance with that geometry even though the crystal elements are disclosed in FIG. 2 as being substantially square in plane view. The square elements are shown here for simplicity in illustrating the multi-element arrangement.

As described in the related application Serial No. 234,150, when these elements are operated as injection lasers, the light is emitted from the region of the P-N junction in a very highly collimated beam. It is quite apparent from the above description of the process and product of the present invention that the structure of FIG. 2 clearly is of advantage in providing for a transfer of optical signals from one associated element to another. Thus, the stimulated optical emission from element 68, as indicated by the arrow 76, is directed very precisely and accurately to the emission stimulation region in the vicinity of the P-N junction of the crystal element 66. This is due not only to the fact that these two elements have been formed initially from the same crystal wafer which is diffused with the same impurities to effectually the same depth and under the same conditions, but it is also due to the exact parallelism of the opposing faces of the elements 66 and 68 due to the extreme accuracy available from the fabrication method of cleaving along crystallographic planes which are in parallel relationship. Thus, the crystal element 66 may be subjected not only to electrical excitation from its associated electrical circuit, but also to the optical stimulation indicated by the arrow 76 from the associated element 68. In like manner, the element 66 may also be subjected to optical stimulation from the element 64 as indicated by a similar arrow 78. Furthermore, many other optical stimulation paths are possible in the structure of FIG. 2. For instance, the element 72 may be subjected to optical stimulation from all three of the facing crystal elements 70, 66, and 74, as respectively indicated by the arrows 80, 82, and 84. With more elaborate crystal element arrays, it will be apparent that more elaborate optical signal patterns are possible. Furthermore, it will be quite apparent to those skilled in the art that the structures produced by the present invention, and as exemplified by FIG. 2, present extremely interesting possibilities because of the multiple signal input possibilities for the laser elements. For instance, an individual element may be arranged to be switched only by a predetermined combination of optical and electrical input signals, and accordingly logical switching functions may be performed.

As pointed out in the previously mentioned related copending patent applications, it is very important in order to obtain efficient injection laser operation that at least two of the opposite faces of an individual element must be perfectly parallel in order to provide the desired reflective properties for optical beams within the crystal element itself. It is an important feature of the present invention, and particularly the product of the invention illustrated in FIG. 2, that the cleaving of the optical faces of the crystal elements not only provides perfect optical surfaces for promoting the efficiency of the internal laser operation of the individual element, but it also immediately provides for perfect alignment and optical interrelationship with the opposed faces of each of the adjacent elements as well.

Another important feature of the present invention, and particularly the multiple element form of the invention is related to the fact that the optical output light from each injection laser element is in an extremely narrow frequency spectrum. Accordingly, in order for optical stimulation from one laser element to be effective to promote optical stimulation in an adjacent element, it is quite important that both elements be just as nearly alike as possible in all physical respects in order to produce and respond to the same optical frequency. Here again, the present structure, being fabricated from a single crystal, provides the optimum conditions for achieving this result.

However, if different properties are desired in the adjacent crystal elements, this is not difficult to arrange. For instance, certain elements can be masked while others are diffused, such as by vapor diffusion with different impurities, to change the characteristic of the diffused element.

The process of the present invention as illustrated in FIG. 3, and particularly steps c, d, and e, and the associated illustrations of FIGS. 4c, d, and e, demonstrates the production of undercuts at the faces of the elements prior to cleaving by means of etching. It will be understood that these undercuts also can be provided by mechanical means such as by directional sandblasting. The initial groove cuts illustrated in FIG. 4b also may be made by ultrasonic cavitation or sand blasting or by sawing. The ultrasonic cavitation, or sand blasting possess the advantages that patterns other than perfectly regular rectangles may be provided. For instance, a single element might be made quite long or large in both dimensions in comparison to its neighbors so as to be aligned to receive optical signals from a large number of its neighbors.

When the undercuts at the faces of the elements are etched, a standard etching solution may be employed which may consist of one part of five normal NaOH or KOH together with one part of a 30% solution of $H_2O_2$. The etching may be carried out with ultrasonic agitation for four or five minutes to obtain an etching depth of approximately five thousandths of an inch.

As indicated in both FIGS. 1 and 2, each of the crystal elements may be provided with an individual electrical contact on its upper surface. Metal may be applied to the upper surface of the wafer for this purpose prior to the cutting and cleaving for the formation of the individual circuit elements.

As mentioned previously, the individual elements in the multiple element structure of FIG. 2 may be employed for purposes other than service as laser elements in which optical signals are to be exchanged between elements. For instance, the structures produced in accordance with the present invention are extremely efficient in their utilization of space, and accordingly they are also quite useful for micro-miniaturized semiconductor switching device circuits. Furthermore, it will appreciated that the principles of the present invention are not limited to the production of single junction semiconductor devices, as any desired number of junctions may be provided for any switching element by conventional semiconductor crystal preparation procedures.

Furthermore, it has been suggested that recombination radiation phenomenon may be usefully employed in devices other than injection lasers. For instance, certain of such devices form the subject matter of related copending patent application Serial No. 239,434 filed on November 23, 1962 by Richard F. Rutz for a "Fast Responding Semiconductor Device Using Light as the Transporting Medium," and assigned to the same assignee as the present application. It is believed that the structures produced in accordance with the present inveniton are quite useful in embodying that prior invention.

It will be apparent that the side faces of the individual elements formed from the protrusions from the main body of the crystal wafer in the embodiment of FIG. 2 may be subjected to optical treatments and additions to improve their optical properties. For instance, coatings similar to those applied to optical lenses may be added to these optical faces. Other measures for the improvement of the optical properties may be also employed. For instance, the entire device may be immersed in a liquid having desirable optical properties. Also, epitaxially compatible solids may be used to fill in the grooves and openings between adjacent elements.

It is also possible to form certain of the crystal elements from different crystal materials which are epitaxially compatible with the original wafer material. Such materials may be formed on the wafer by well-known techniques such as those characterized as vapor growth methods. By this method, it is possible to provide for transfer of optical signals from one crystal element to another which have a selected optical wavelength relationship. For instance, one crystal element may provide an optical input to an adjacent element which is particularly selected to serve as a "pump" for the laser action of the second element.

While the invention has been particularly shown and described with reference to preferred embodiments thereof, it will be understood by those skilled in the art that various changes in form and details may be made therein without departing from the spirit and scope of the invention.

What is claimed is:
1. A semiconductor crystal structure comprising:
a main semiconductor crystal body formed predominantly of a first conductivity type;
at least one semiconductor element included as a part of said semiconductor crystal body but protruding from a main surface thereof;
said semiconductor element protrusion being much smaller than the remainder of said semiconductor body and including conductivity determining impurities to form a second conductivity type together with a junction between said first and second conductivity types;
at least two opposed faces of said element protruding from said main surface substantially perpendicular to said junction and coinciding with crystallographic planes of minimum bond strength of said semiconductor crystal;
and means connected across said junction in said element for applying a signal thereto to produce stimulated emmission of radiation in said element which propogates between said two opposed faces of said element.

2. A crystalline signal translating structure wherein the geometry of a crystal element contributes to the signal processing therein comprising:
   a crystalline body including a main surface;
   said body having a base portion with a first cross sectional area;
   said body having at least one protruding device portion included as a part of the same crystal structure and having a rectangular cross sectional area smaller than said first cross sectional area;
   said protruding device portion having a top surface raised above said main surface and two opposite side surfaces;
   an undercut at the base of each of said side surfaces;
   said side surfaces corresponding to parallel crystallographic planes of minimum bond strength and being optically flat and mutually parallel.

3. An injection laser structure comprising:
   a predominantly N conductivity type compound semiconductor crystal wafer having a base portion and at least one main surface perpendicular to the crystallographic planes of minimum bond strength;
   said crystal including at least one injection laser semiconductor element as a part of said crystal wafer and protruding from said base portion thereof;
   said element including P type impurities to form a PN junction;
   said element having a rectangular parallelepiped configuration protruding from said base portion with the faces thereof being perpendicular ot said main surface of said crystal wafer;
   at least two of the opposite faces of said element being coincident with crystallographic parallel planes of minimum bond strength of said crystal;
   a first electrical contact on an outer surface of said element;
   a second electrical contact on said predominantly N conductivity type crystal wafer from which said element protrudes;
   and means connected to said electrical contacts for forward biasing said PN junction to produce stimulated emission of radiation in said element which propagates between said two opposite faces of said element.

4. A multiple element optical crystal structure comprising:
   a wafer of a crystal material having optical maser properties;
   said crystal wafer having a base portion and at least one main surface perpendicular to the crystallographic planes of minimum bond strength;
   said crystal including a plurality of elements as a part of said crystal wafer protruding from a main surface thereof;
   each of said elements having an upper surface and side faces raised above said base portion;
   at least two opposite side faces of each said element being perpendicular to said main surface of said crystal wafer and coincident with crystallographic planes of minimum bond strength of said crystal;
   said opposite side faces of each said element being optically flat and mutually parallel and forming therebetween an optical cavity.

5. A multiple element injection laser structure comprising:
   a predominantly N conductivity type gallium arsenide crystal wafer having a base portion and at least one main surface perpendicular to the crystallographic planes of minimum bond strength;
   said crystal including a plurality of injection laser semiconductor elements as a part of said crystal wafer and protruding from said base portion thereof,
   each of said elements including P type impurities to form a PN junction;
   each of said elements having a rectangular parallelepiped configuration protruding from said base portion with the faces thereof being perpendicular to said main surfaces of said crystal wafer and coincident with crystallographic planes of minimum bond strength of said crystal;
   each of said elements including an electrical contact on an outer surface thereof;
   a further electrical contact on said predominantly N type gallium arsenide crystal from which said elements protrude;
   and said elements being arranged in mutual alignment for exchange of optical signals of coherent light.

6. A multiple element injection laser structure comprising:
   a main semiconductor crystal body formed predominantly of a first conductivity type;
   said crystal including as a part thereof a base portion and a plurality of injection laser semiconductor elements protruding from a said base portion;
   each of said elements including impurities of a second conductivity type to form a junction between said first and second conductivity types;
   each of said elements having two opposing faces coinciding with crystallographic planes of minimum bond strength of said crystal;
   said opposing faces of said elements being parallel with each other and perpendicular to said junctions in said elements;
   each of said elements including an electrical contact on an outer surface thereof;
   a further electrical contact on said semiconductor crystal body from which said elements protrude;
   and said junctions in elements being arranged in mutual alignment for exchange of optical signals of coherent light.

7. A semiconductor device comprising:
   a semiconductor crystal body;
   first and second semiconductor elements formed as a part of said semiconductor crystal body;
   each said first and second element protruding from a surface of said semiconductor crystal body;
   each said element having at least first and second opposite faces protruding from said semiconductor crystal body;
   said first and second faces of each of said elements being optically flat and mutually parallel;
   a semiconductor junction formed in each said protruding element;
   said junctions in said elements being aligned with each other with each junction extending in the same plane perpendicular to said parallel faces of said elements;
   and means connected across said junction in said first element for applying a signal thereto to produce by stimulated emission of radiation in said first element a light output which passes through at least one of the parallel faces thereof and one of the parallel faces of said second element to said aligned junction in said second element.

8. The semiconductor device of claim 7 wherein said crystallographic planes correspond to planes of minimum bond strength of said semiconductor crystal body.

9. A multiple element optical crystal structure comprising:
   a body of semiconductor material including a base portion and a plurality of individual laser elements protruding from said base portion;
   each said individual element having two opposite side faces;
   said two opposite faces of each said element coinciding with parallel crystallographic planes of said crystal body and forming therebetween an optical cavity;
   said cavities being aligned with each other to allow for transmission of radiation therebetween;
   and means for applying pumping energy to at least certain of said elements to produce stimulated emission of radiation in said elements.

References Cited by the Examiner

UNITED STATES PATENTS

| | | | |
|---|---|---|---|
| 2,654,358 | 10/1953 | Lake | 125—33 |
| 2,748,041 | 5/1956 | Leverenz | 148—33 |
| 3,005,937 | 10/1961 | Wallmark et al. | 148—33.2 X |
| 3,039,362 | 6/1962 | Dobrowolski | 88—106 |
| 3,043,958 | 7/1962 | Diemer | 250—213 |
| 3,043,959 | 7/1962 | Diemer | 250—213 |
| 3,054,034 | 9/1962 | Nelson | 148—33.2 X |
| 3,059,117 | 10/1962 | Boyle et al. | 331—94.5 |
| 3,101,706 | 8/1963 | Pyle et al. | 125—33 |
| 3,131,098 | 4/1964 | Krsek et al. | 148—175 |
| 3,162,932 | 10/1964 | Wood et al. | |

OTHER REFERENCES

"Diode Lasers to Accelerate Optical Communications," Electronics, vol. 35, No. 46, pp. 24–25.

Grodzinski: Diamond and Gem Stone Industrial Production, 1942, pp. 40–42.

JEWELL H. PEDERSEN, *Primary Examiner*.

L. ORLOFF, R. L. WIBERT, *Assistant Examiners*.